United States Patent [19]

Iizuka

[11] Patent Number: 5,417,627
[45] Date of Patent: May 23, 1995

[54] SHIFT CONTROLLER USING SHIFT TIMING OR SPEED RATIO DEPENDENT ON THE CHANGE OF ONE WAY CLUTCH FOR AUTOMOTIVE AUTOMATIC TRANSMISSION

[75] Inventor: Naonori Iizuka, Fuji, Japan

[73] Assignee: JATCO Corporation, Fuji, Japan

[21] Appl. No.: 8,281

[22] Filed: Jan. 25, 1993

[30] Foreign Application Priority Data

Jan. 28, 1992 [JP] Japan .................. 4-037129

[51] Int. Cl.$^6$ ............................ F16H 5/66
[52] U.S. Cl. ...................... 477/143; 477/148
[58] Field of Search ............... 74/861, 864, 866; 364/424.1; 477/68, 79, 80, 143, 144, 148

[56] References Cited

U.S. PATENT DOCUMENTS

| 4,970,916 | 11/1990 | Narita | 364/424.1 X |
| 5,079,971 | 1/1992 | Yoshimura et al. | 364/424.1 X |
| 5,113,722 | 5/1992 | Iizuka | 74/866 |
| 5,161,432 | 11/1992 | Matsumoto et al. | 74/861 X |
| 5,235,877 | 8/1993 | Takahashi et al. | 74/866 |

FOREIGN PATENT DOCUMENTS 4014603 11/1990 Germany .
63-251652 10/1988 Japan .
1-188750 7/1989 Japan .

OTHER PUBLICATIONS

Patent Abstracts of Japan, M-1031 Sep. 28, 1990, vol. 14, No. 454 and JP-2-180362, published Jul. 13, 1990.
Patent Abstracts of Japan, M-976 May 21, 1990, vol. 14, No. 237, and JP-2-62470, published Mar. 2, 1990.

Primary Examiner—Dirk Wright
Assistant Examiner—Khoi Q. Ta
Attorney, Agent, or Firm—Foley & Lardner

[57] ABSTRACT

An automotive automatic transmission includes a one-way clutch and solenoids which, when switched in ON-OFF manner, induces a speed change of the transmission. The rotation speed ratio between input and output shafts of the transmission is obtained. When a speed change becomes necessary, a judgment is carried out as to whether the necessary speed change is of a type which needs the engaged condition of the one-way clutch or not. If the speed change needs the engaged condition of the one-way clutch, switching of the solenoids is carried out when the rotation speed ratio comes to a predetermined value, while, if the speed change does not need the engaged condition of the one-way clutch, switching of the solenoids is carried out when a predetermined time is passed from the time when the necessity of the speed change is made.

6 Claims, 5 Drawing Sheets

FIG.2

| | | C18 | C20 | C22 | C24 | B28 | B26 | OWC 30 | OWC 29 | GEAR RATIO | α1 = 0.440<br>α2 = 0.493 |
|---|---|---|---|---|---|---|---|---|---|---|---|
| D RANGE | 1ST. SPEED | | | O | | | | O | O | $\dfrac{1+\alpha_2}{\alpha_2}$ | 3.027 |
| | 2ND. SPEED | | O | O | | O | | O | | $\dfrac{\alpha_1+\alpha_2+\alpha_1\cdot\alpha_2}{\alpha_2(1+\alpha_1)}$ | 1.619 |
| | 3RD. SPEED | | O | O | O | | | O | | 1 | 1.000 |
| | 4TH. SPEED | | | (O) | O | O | | | | $\dfrac{1}{1+\alpha_1}$ | 0.694 |
| ENGINE BRAKE RUNNING STATE | 1ST. SPEED | | | (O) | | | O | (O) | (O) | | |
| | 2ND. SPEED | | O | (O) | O | O | | (O) | | | |
| | 3RD. SPEED | | O | (O) | O | | | (O) | | | |
| | 4TH. SPEED | | | (O) | O | O | | | | | |
| REVERSE | | O | | | | | O | | | $-\dfrac{1}{\alpha_1}$ | -2.272 |

SHIFT CONTROLLER USING SHIFT TIMING OR SPEED RATIO DEPENDENT ON THE CHANGE OF ONE WAY CLUTCH FOR AUTOMOTIVE AUTOMATIC TRANSMISSION

BACKGROUND OF THE INVENTION

This application is connected with U.S. patent applications Ser. Nos. 07/795,989 (filed Nov. 2, 1991), 07/850,283 (filed Mar. 12, 1992), 07/878,469 (filed May 5, 1992), 07/939,600 (filed Sep. 2, 1992) and 07/969,072 (filed Oct. 30, 1992).

1. Field of the Invention

The present invention relates in general to automotive automatic transmissions, and more particularly to a control system for the automotive automatic transmissions.

2. Description of the Prior Art

In order to clarify the task of the present invention, one conventional control system for automotive automatic transmissions will be outlined, which is shown in Japanese Patent First Provisional Publication 1-188750.

In this conventional control system, there is employed a measure by which in carrying out a specified gear change, the actual switching of associated solenoids is carried out when the rotation speed ratio between the input and output shafts of the transmission comes to a predetermined value. That is, the actual switching of the solenoids is not strictly timed with the time when necessity of the gear change is judged. With the measure, appropriate gear change timing is obtained even in a so-called "jump over gear change" wherein the gear change is carried out skippingly and a so-called "foot release gear change" wherein the gear change is carried out with a driver's foot kept released from the accelerator pedal.

However, in the above-mentioned conventional control system, the specified gear change is always made by putting a certain one-way clutch to OFF condition from ON condition. That is, gear changes other than the specified gear change are made by having the one-way clutch kept in ON condition. However, in this case, the following undesirable phenomenon tends to occur. That is, in the gear changes other than the specified gear change, the rotation speed ratio between the input and output shafts of the transmission fails to obtain the predetermined value. This means that such gear changes never take place.

SUMMARY OF THE INVENTION

It is therefore an object of the present invention to provide a control system for an automotive automatic transmission, which is free of the above-mentioned drawback.

According to a first aspect of the present invention, there is provided a control system for an automotive automatic transmission wherein a one-way clutch which has ON and OFF conditions and solenoids which induce a speed gear change when subjected to ON/OFF switching. The control system comprises first means for judging whether a speed gear change is necessary or not; second means deriving a rotation speed ratio between input and output shafts of the transmission; third means for counting the time passed from the time when the necessity of the speed change is judged by the first means; fourth means for issuing a first signal when the necessary speed gear change is of a type which needs a switching from ON condition to OFF condition of said one-way clutch and issuing a second signal when the necessary speed gear change is of a type which does not need such switching of said one-way clutch, fifth means for switching the solenoids when, upon issuance of the first signal, the rotation speed ratio comes to a predetermined value; and sixth means for switching the solenoids when, upon issuance of the second signal, a predetermined time is counted by the third means.

According to a second aspect of the present invention, there is provided a control system for an automotive automatic transmission in which a one-way clutch which has ON and OFF conditions and solenoids which induce a speed gear change when subjected to ON/OFF switching. The control system comprises means for detecting an engine load; means for detecting a rotation speed of an input shaft of the transmission; means for detecting a rotation speed of an output shaft of the transmission; means for judging whether a speed gear change is necessary or not by analyzing both the detected engine load and the detected rotation speed of the output shaft; means for deriving a rotation speed ratio between the input and output shafts by dividing the rotation speed of the input shaft by that of the output shaft; means for counting the time passed from the time when the necessity of the speed change is judged; means for issuing a first signal when the necessary speed gear change is of a type which needs a switching from ON condition to OFF condition of said one-way clutch and issuing a second signal when the necessary speed gear change is of a type which does not need such switching of said one-way clutch; means for switching the solenoids when, upon issuance of the first signal, the rotation speed ratio comes to a predetermined value; and means for switching the solenoids when, upon issuance of the second signal, a predetermined time is counted by the time counting means.

BRIEF DESCRIPTION OF THE DRAWINGS

Other objects and advantages of the present invention will become apparent from the following description when taken in conjunction with the accompanying drawings, in which:

FIG. 2 is a TABLE showing ON/OFF (viz., engaged/disengaged) conditions of various friction elements of the automatic transmission with respect to various speeds selected by the transmission;

DETAILED DESCRIPTION OF THE PRESENT INVENTION

Figure 1:
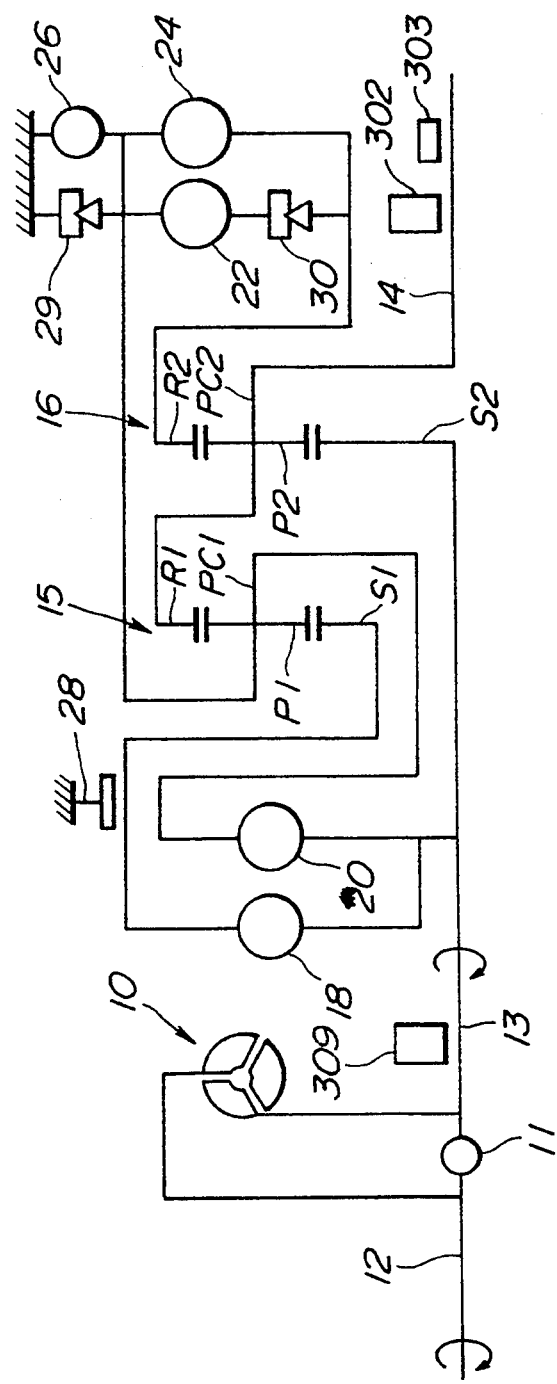
FIG. 1 is a schematic illustration of an automotive automatic transmission to which a control system of the present invention is applied.

Referring to the drawings, there is shown an embodiment of the present invention.

In FIG. 1, there is schematically shown an automotive automatic transmission of a type having an overdrive, four forward speeds and one reverse.

The transmission comprises an input shaft 13 to which a torque of an engine output shaft 12 is transmitted through a torque converter 10. Designated by numeral 14 is an output shaft of the transmission through which a driving force is fed to a final drive device (not shown).

Between the input and output shafts 13 and 14, there are disposed, in the illustrated manner, a first planetary gear unit 15, a second planetary gear unit 16, a reverse clutch 18, a high clutch 20, a forward clutch 22, an overrunning clutch 24, a low-and-reverse brake 26, a band brake 28, a low-oneway clutch 29 and a forward-oneway clutch 30.

The torque converter 10 has a lock-up clutch 11 installed therein.

The first planetary gear unit 15 comprises a sun gear S1, an internal gear R1, pinion gears P1 each meshing with both the sun gear S1 and the internal gear R1, and a pinion gear carrier PC1 carrying the pinion gears P1.

The pinion gear carrier PC1 is connectable to the input shaft 13 through the high clutch 20, and the sun gear S1 is connectable to the input shaft 13 through the reverse clutch 18.

The second planetary gear unit 16 comprises a sun gear S2, an internal gear R2, pinion gears P2 each meshing with both the sun gear S2 and the internal gear R2, and a pinion gear carrier PC2 carrying the pinion gears P2.

The pinion gear carrier PC1 of the first planetary gear unit 15 is connectable to the internal gear R2 of the second planetary gear unit 16 through the forward clutch 22 and the forward-oneway clutch 30 which are connected in tandem or through the overrunning clutch 24 which is arranged in parallel with the tandem connected clutches 22 and 30.

The sun gear S2 of the second planetary gear unit 16 is constantly connected with the input shaft 13, and the internal gear R1 of the first planetary gear unit 15 and the pinion gear carrier PC2 of the second planetary gear unit 16 are constantly connected with the output shaft 14.

The low-and-reverse brake 26 can fix the pinion gear carrier PC1 of the first planetary gear unit 15 and the band brake 28 can fix the sun gear S1 of the first planetary gear unit 15.

The low-oneway clutch 29 is so arranged as to permit only a normal rotation (viz., the rotation in the same direction as the engine output shaft 12) of the pinion gear carrier PC1 of the first planetary gear unit 15. That is, a reversed rotation of the pinion gear carrier PC1 is suppressed by the clutch 29.

By selectively engaging and disengaging the clutches 18, 20, 22, 24, 29 and 30 and the brakes 26 and 28 in various combinations, the elements (viz., S1, S2, R1, R2, PC1 and PC2) of the first and second planetary gear units 15 and 16 are forced to change their operating conditions. With this changing, the ratio of rotation speed of the output shaft 14 relative to that of the input shaft 13 can be variously changed.

FIG. 2 is a table showing the various gear speeds (viz., first, second, third and fourth forward speeds and a reverse) which are given by the ON/OFF (viz., engaged/disengaged) conditions of the clutches 18, 20, 22, 24, 29 and 30 and the brakes 26 and 28.

In the table, the mark "O" means "ON" or engaged condition of the associated clutch or brake and "blank" means "OFF" or disengaged condition of the same. The mark "(O)" means that the engaged condition does not participate in power transmission in the established gear speed. It is to be noted "α1" or "α2" is a ratio of the number of teeth of the sun gear S1 or S2 relative to that of the internal gear R1 or R2, and the "GEAR RATIO" is the ratio of the rotation speed of the input shaft 13 relative to that of the output shaft 14.

Figure 3:
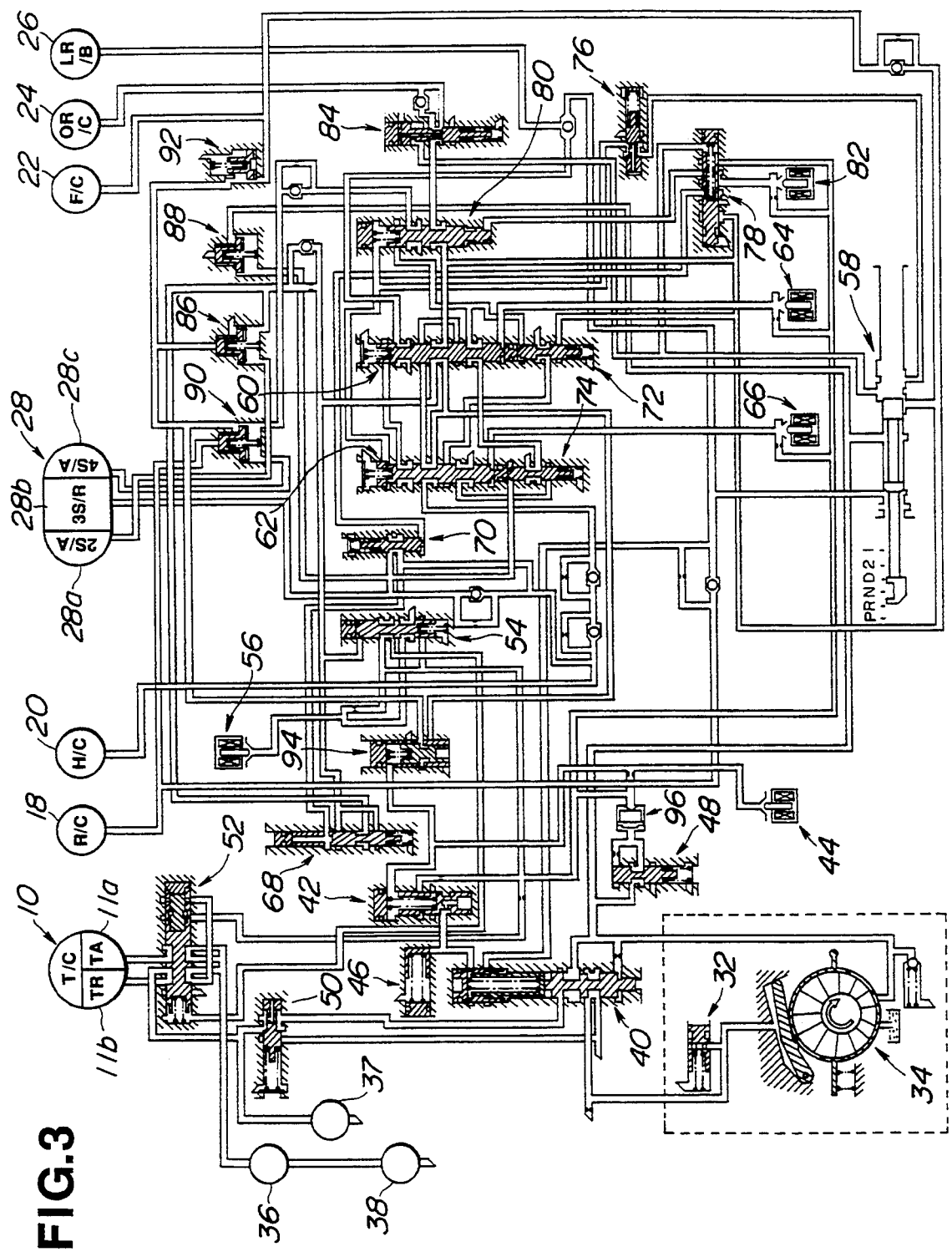
FIG. 3 is a hydraulic circuit of the automatic transmission.

FIG. 3 shows a hydraulic control circuit for controlling operation of the above-mentioned automatic transmission. The control circuit comprises a line pressure control valve 40, a pressure modifier valve 42, a line pressure control solenoid 44, a modified pressure accumulator 46, a pilot valve 48, a torque converter relief valve 50, a lock-up control valve 52, a first shuttle valve 54, a lock-up control solenoid 56, a manual valve 58, a first shift valve 60, a second shift valve 62, a first shift solenoid 64, a second shift solenoid 66, a servo-charger valve 68, a 3-2 timing valve 70, a 4-2 relay valve 72, a 4-2 sequence valve 74, a first reducing valve 76, a second shuttle valve 78, an overrunning clutch control valve 80, an overrunning clutch solenoid (viz., engine brake controlling solenoid) 82, an overrunning clutch reducing valve 84, a 1-2 accumulator 86, a 2-3 accumulator 88, a 3-4 accumulator 90, a N-D accumulator 92, an accumulator control valve 94 and a filter 96. These elements are connected in such a manner as is shown in the drawing.

The torque converter 10 has therein pressure apply and release chambers 11a and 11b for the lock-up clutch 11. This torque converter 10, the forward clutch 22, the high clutch 20, the band brake 28, the reverse clutch 18, the low-and-reverse brake 26 and the overrunning clutch 24 are connected to the hydraulic control circuit in the illustrated manner. The band brake 28 has a pressure apply chamber 28a for the second speed, a pressure release chamber 28b for the third speed and a pressure apply chamber 28c for the fourth speed incorporated therewith.

An oil pump 34 of capacity variable vane type, an oil cooler 36, a front lubrication circuit 37 and a rear lubrication circuit 38 are connected in the illustrated manner. The oil pump 34 is equipped with a feedback accumulator 32.

The hydraulic control circuit of this type is described in detail in Japanese Patent First Provisional Publication No. 63-251652.

Figure 4:
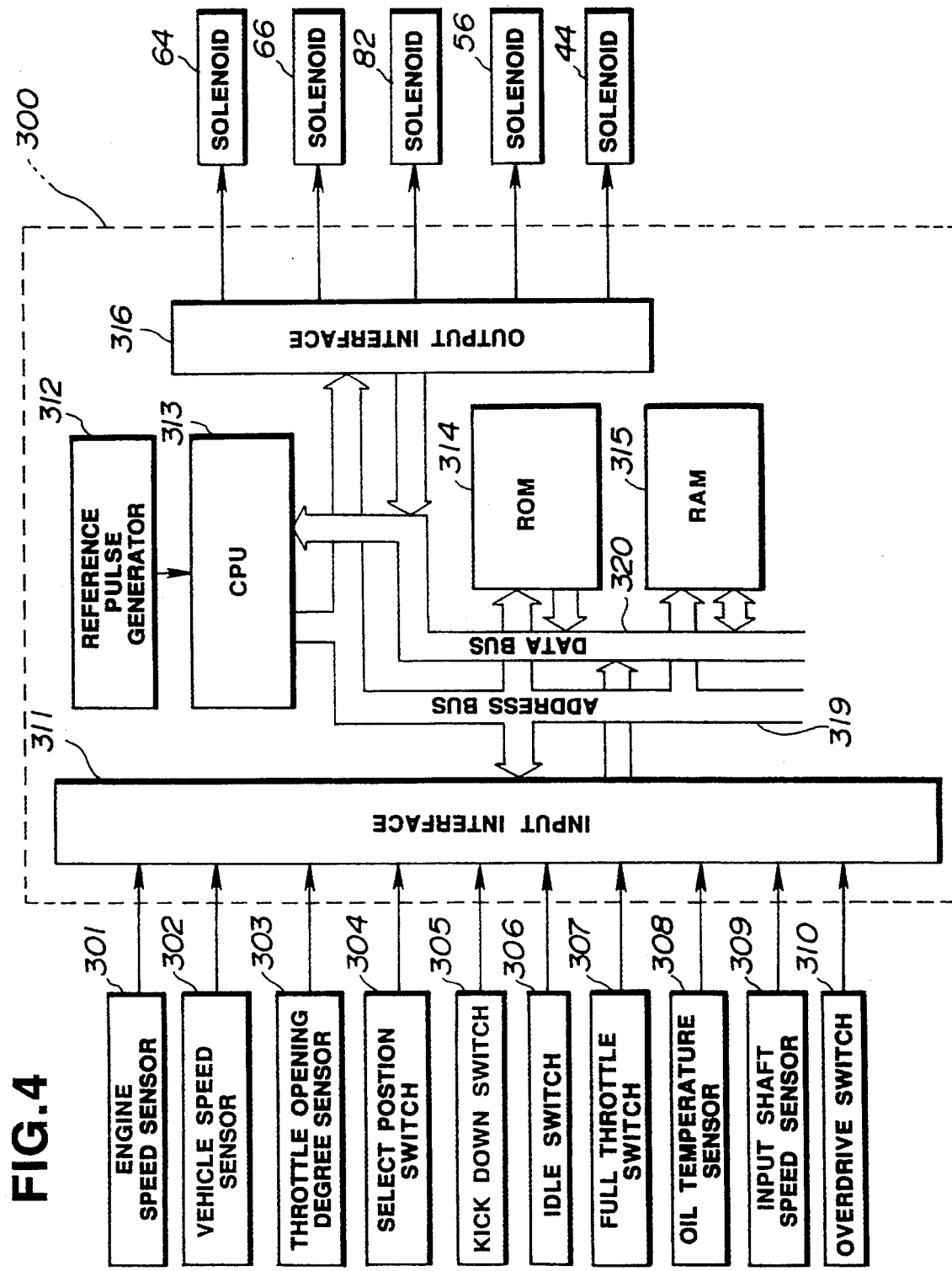
FIG. 4 is a schematic view of a control unit which constitutes an essential part of the control system of the present invention.

FIG. 4 shows schematically a control unit 300 which controls the operation of the solenoids 44, 56, 64, 66 and 82. As shown, the control unit 300 comprises an input interface 311, a reference pulse generator 312, a central processing unit (CPU) 313, a read only memory (ROM) 314, a random access memory (RAM) 315 and an output interface 316, an address bus 319 and a data bus 320.

Information signals from an engine speed sensor 301, a vehicle speed sensor 302 (viz., means for detecting the rotation speed of the output shaft of the transmission), a throttle valve opening degree sensor 303 (means for detecting the engine load), a select position switch 304, a kick down switch 305, an idle switch 306, a full throttle switch 307, an oil temperature switch 308, an input shaft speed sensor 309 (means for detecting the rotation speed of the input shaft of the transmission) and an over-drive switch 310 are fed to the input interface 311 of the control unit 300.

Figure 5:
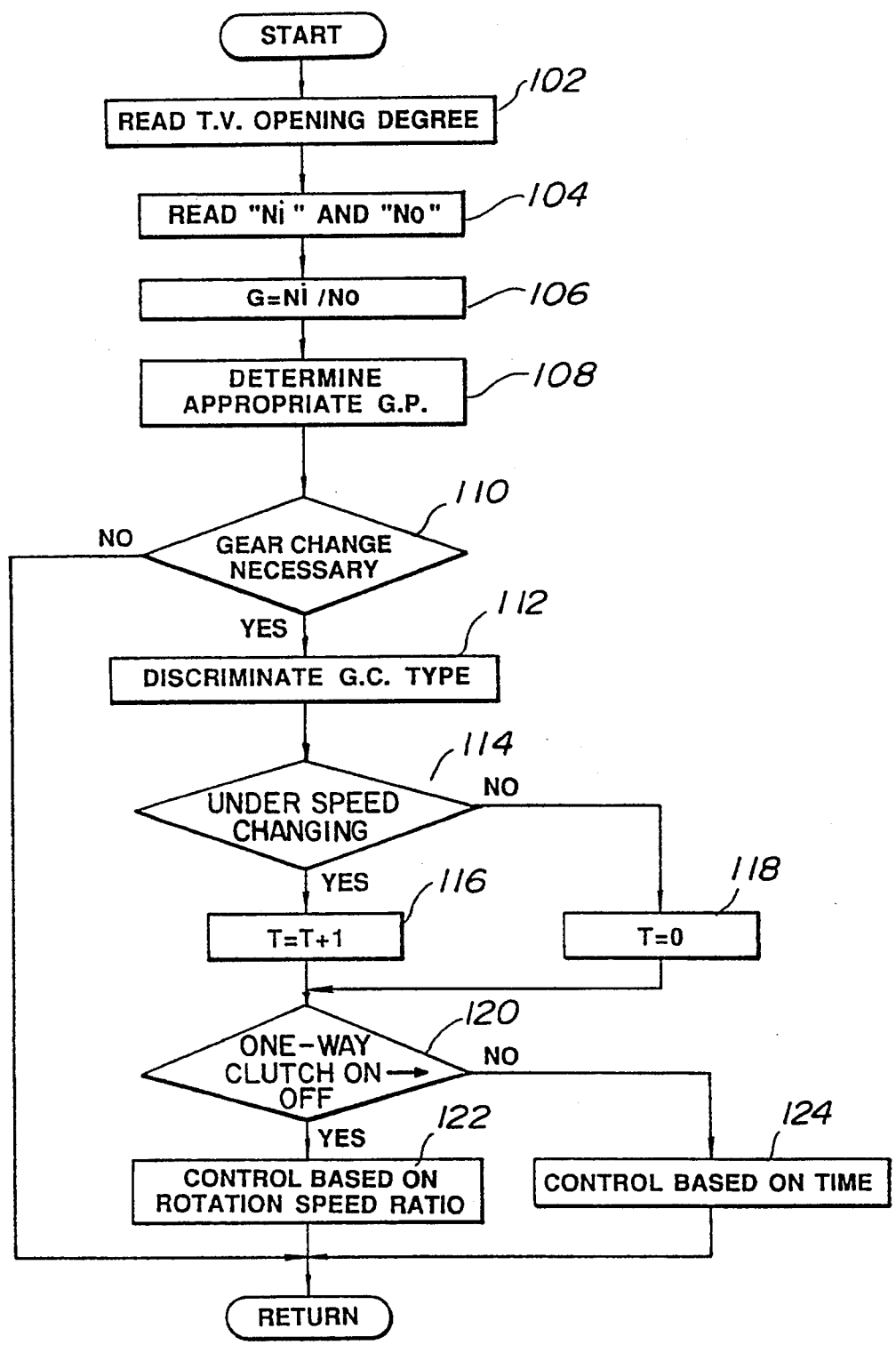
FIG. 5 is a flowchart showing operation steps carried out in a computer of the control unit.

The control unit 300 controls the automatic transmission in such a manner as is depicted in the flowchart of FIG. 5.

That is, at step 102, the throttle valve opening degree is read, and at step 104, the rotation speeds "Ni" and "No" of the input and output shafts 13 and 14 (see FIG. 1) of the transmission are read. Then, at step 106, the rotation speed ratio "G" between the input and output shafts 13 and 14 is obtained by dividing "Ni" by "No", that is, $$"G=Nt/No" \quad (1)$$

At step 108, by analyzing the throttle valve opening degree and the output shaft rotation speed "No", a gear position appropriate for the existing condition of the vehicle is determined. Then, at step 110, a judgment is carried out as to whether a gear change to such gear position is necessary or not. If Yes, that is, when the gear change is judged necessary, discrimination of the gear change type is made at step 112. Then, at step 114, a judgment is carried out as to whether the transmission is under gear changing or not. If Yes, that is, when the transmission is under gear changing, the calculation "T=T+1" is carried out in a timer at step 116. If No at step 114, that is, when the transmission is not under gear changing, the calculation "T=0" is carried out in the timer at step 118. Then, at step 120, a judgment is carried out as to whether the gear type thus discriminated at step 112 needs a switching from ON condition to OFF condition of a certain one-way clutch or not.

It is to be noted that the switching from ON condition to OFF condition of the certain one-way clutch means a switching from ON condition to OFF condition of at least one of the one-way clutches 29 and 30. As is seen from the table of FIG. 2, gear changes induced by such switching involve a first to second speed gear change, a first to third speed gear change, a first to fourth speed gear change, a second to fourth speed gear change and a third to fourth speed gear change.

If Yes at step 120, that is, when the gear change is judged to need the switching from ON condition to OFF condition of the certain one-way clutch, the gear change timing is carried out based on the rotation speed ratio "G" at step 122. That is, in this case, the switching of the associated solenoids is carried out when the rotation speed ratio "G" comes to a predetermined value.

If No at step 120, that is, when the gear change is judged not to need the switching from ON condition to OFF condition of the certain one-way clutch, the gear change timing is carried out based on the time counted by the timer at step 124. That is, in this case, the switching of the associated solenoids is carried out when the time counted by the timer from the judgment of the necessity of the gear change comes to a predetermined value.

As is understood from the forgoing description, in case of gear changes of a type which needs the switching from ON condition to OFF condition of the certain one-way clutch, the gear change timing is controlled based on the rotation speed ratio between the input and output shafts 13 and 14, which is identical to the gear change carried out in the afore-mentioned conventional control. Thus, appropriate gear change timing is obtained even in the "jump over gear change" and the "foot release gear change".

Furthermore, in case of gear changes of a type which does not need the switching from ON condition to OFF condition of the certain one-way clutch, the switching of the associated solenoids is carried out when a predetermined time is passed after the judgment for the necessity of the gear change. Thus, the undesired phenomenon wherein, like in the afore-mentioned conventional control, the gear change does not take plate for ever does not occur in the present invention.

What is claimed is:

1. In an automotive automatic transmission, having at least one one-way clutch which has ON and OFF conditions and solenoids which induce a speed gear change when subjected to ON/OFF switching,
   a control system comprising:
   a first means for judging whether a speed gear change is necessary or not;
   second means for deriving a rotation speed ratio between input and output shafts of said transmission;
   third means for counting the time which passes from the time when the necessity of the speed gear change is judged by said first means;
   fourth means for issuing a first signal when the necessary speed gear change is of a type which needs a switching from ON condition to OFF condition of said at least one one-way clutch and issuing a second signal when the necessary speed gear change is of a type which does not need such switching of said at least one one-way clutch;
   fifth means for switching said solenoids when, upon issuance of said first signal, said rotation speed ratio comes to a predetermined value; and
   sixth means for switching said solenoids when, upon issuance of said second signal, a predetermined time is counted by said third means.

2. A control system as claimed in claim 1, further comprising:
   seventh means for detecting an engine load;
   eighth means for detecting a rotation speed of said input shaft of the transmission; and
   ninth means for detecting a rotation speed of said output shaft of the transmission.

3. A control system as claimed in claim 2, in which said first means judges the necessity of the speed gear change by analyzing information issued from said seventh and ninth means.

4. A control system as claimed in claim 3, in which second means calculates said rotation speed ratio by analyzing information issued from said seventh and eighth means.

5. A control system as claimed in claim 4, in which said seventh means detects the engine load by measuring the throttle valve opening degree of the engine.

6. In an automotive automatic transmission having at least one one-way clutch which has ON and OFF conditions and solenoids which induce a speed gear change when subjected to ON/OFF switching,
   a control system comprising:
   means for detecting an engine load;
   means for detecting a rotation speed of an input shaft of the transmission;
   means for detecting a rotation speed of an output shaft of the transmission;
   means for judging whether a speed gear change is necessary or not by analyzing both the detected engine load and the detected rotation speed of said output shaft;
   means for deriving a rotation speed ratio between said input and output shafts by dividing the rotation speed of said input shaft by that of said output shaft;
   means for counting the time passed from the time when the necessity of the speed change is judged;

means for issuing a first signal when the necessary speed gear change is of a type which needs a switching from ON condition to OFF condition of said at least one one-way clutch and issuing a second signal when the necessary speed gear change is of a type which does not need such switching of said at least one one-way clutch;

means for switching said solenoids when, upon issuance of said first signal, said rotation speed ratio comes to a predetermined value; and means for switching said solenoids when, upon issuance of said second signal, a predetermined time is counted by the time counting means.

* * * * *